United States Patent [19]

Greinke et al.

[11] 4,327,620
[45] * May 4, 1982

[54] SLITTER HAVING PIVOTAL MULTIPLE SPACED PAIRS OF ARBORS

[75] Inventors: James Greinke, Round Lake Beach; Douglas Matsunaga, Vernon Hills; Eric W. Mosquera, Schaumburg, all of Ill.

[73] Assignee: Braner Enterprises, Schiller Park, Ill.

[*] Notice: The portion of the term of this patent subsequent to Jan. 15, 1997, has been disclaimed.

[21] Appl. No.: 109,766

[22] Filed: Jan. 7, 1980

Related U.S. Application Data

[63] Continuation of Ser. No. 894,741, Apr. 10, 1978, Pat. No. 4,183,273.

[51] Int. Cl.³ .......................... B26D 1/00; B23D 19/00
[52] U.S. Cl. ...................................... 83/479; 83/552; 83/554
[58] Field of Search .................. 83/479, 480, 481, 563

[56] References Cited

U.S. PATENT DOCUMENTS

| Re. 27,918 | 2/1974 | Montquire | 83/479 X |
|---|---|---|---|
| 1,959,424 | 5/1934 | Hawkins | 83/479 X |
| 3,080,793 | 3/1963 | Knepshield | 83/479 |
| 3,260,146 | 7/1966 | Child | 83/479 |
| 3,408,886 | 11/1968 | David | 83/479 X |
| 3,503,293 | 3/1970 | Sander | 83/479 |
| 3,638,523 | 2/1972 | Yasudo et al. | 83/563 X |
| 3,727,503 | 4/1973 | Braner et al. | 83/479 |
| 3,735,660 | 5/1973 | Pearl | 83/398 |
| 4,183,273 | 1/1980 | Greinke et al. | 83/479 |

*Primary Examiner*—James M. Meister
*Attorney, Agent, or Firm*—Oltsch, Knoblock & Hall

[57] ABSTRACT

A slitter having multiple spaced pairs of arbors carried upon a rotatable housing which is shiftable as a unit toward and away from a second housing which is adapted to support a selected pair of such arbors during the slitting operation.

10 Claims, 5 Drawing Figures

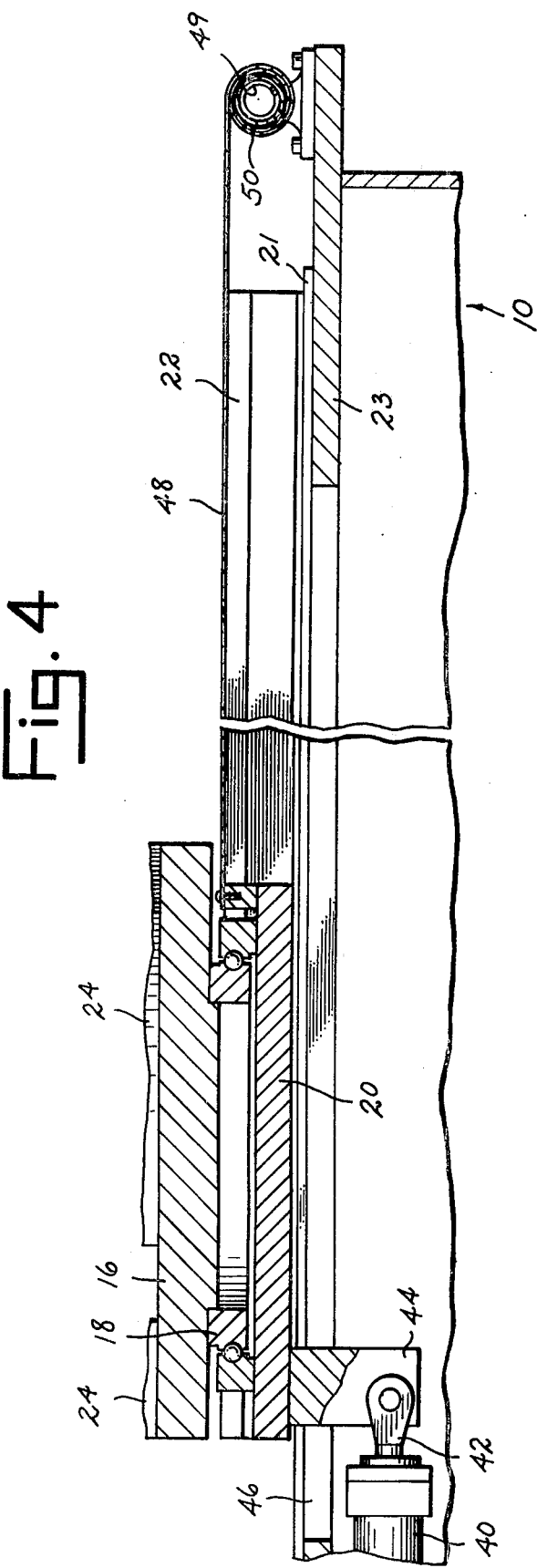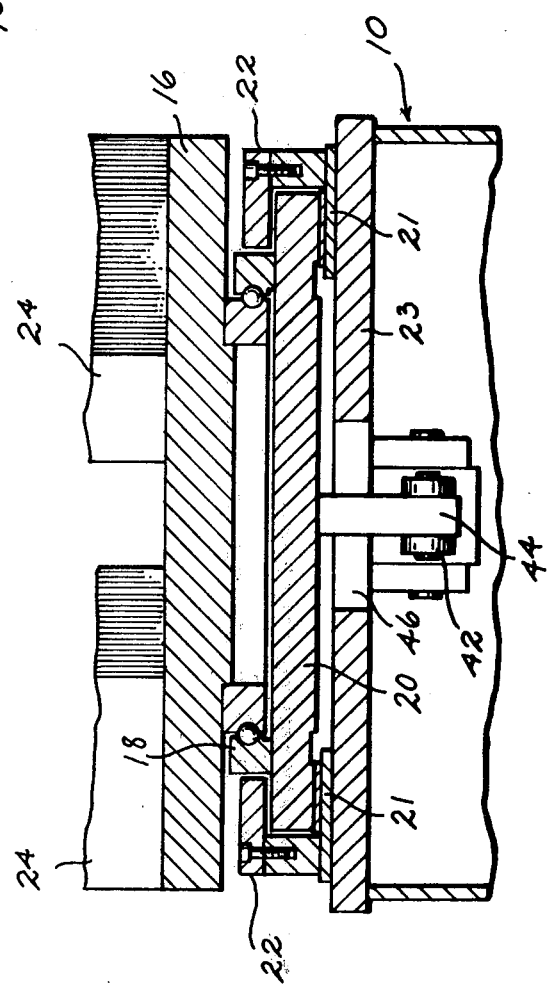

SLITTER HAVING PIVOTAL MULTIPLE SPACED PAIRS OF ARBORS

This is a continuation of application Ser. No. 894,741, filed Apr. 10, 1978, now U.S. Pat. No. 4,183,273.

SUMMARY OF THE INVENTION

This invention relates to a multiple head slitter and will have specific application to a slitter which can carry a plurality of cutter assemblies to enable the user of the slitter to rapidly and efficiently change from one slitting operation to another.

The slitter of this invention includes a frame carrying inboard and outboard spaced bearing housings. Multiple spaced pairs of arbors are carried by the inboard bearing housing which in turn is rotatably supported upon the frame so as to be pivotal about a vertical axis. Additionally, the inboard bearing housing is shiftable toward and away from the outboard bearing housing to enable a selected pair of arbors to be aligned with the outboard bearing housing and to be brought into supporting contact with the housing. One arbor of each of the pairs of arbors when journaled within the outboard bearing housing may be power driven so as to effect or assist in the cutting operation. While one pair of arbors is journaled between the inboard and outboard bearing housings performing the slitting operation, one or more of the other pairs of arbors may be provided with newly assembled cutters in preparation for a subsequent slitting operation.

Accordingly, it is an object of this invention to provide a slitter having multiple spaced pairs of arbors carried upon a pivotal housing which is shiftable toward and away from a second supporting bearing housing.

Another object of this invention is to provide a slitter having multiple spaced pairs of arbors carried upon a laterally shiftable, rotative bearing housing in which one or more pairs of arbors may be preassembled with cutters for a subsequent slitting operation while a first pair of such arbors is performing a slitting operation.

Another object of this invention is to provide a slitter which is of efficient and time saving operation.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 4 is a fragmentary sectional view taken along line 4—4 of FIG. 1.

FIG. 5 is a fragmentary sectional view taken along line 5—5 of FIG. 3.

DESCRIPTION OF THE PREFERRED EMBODIMENT

Figure 1:
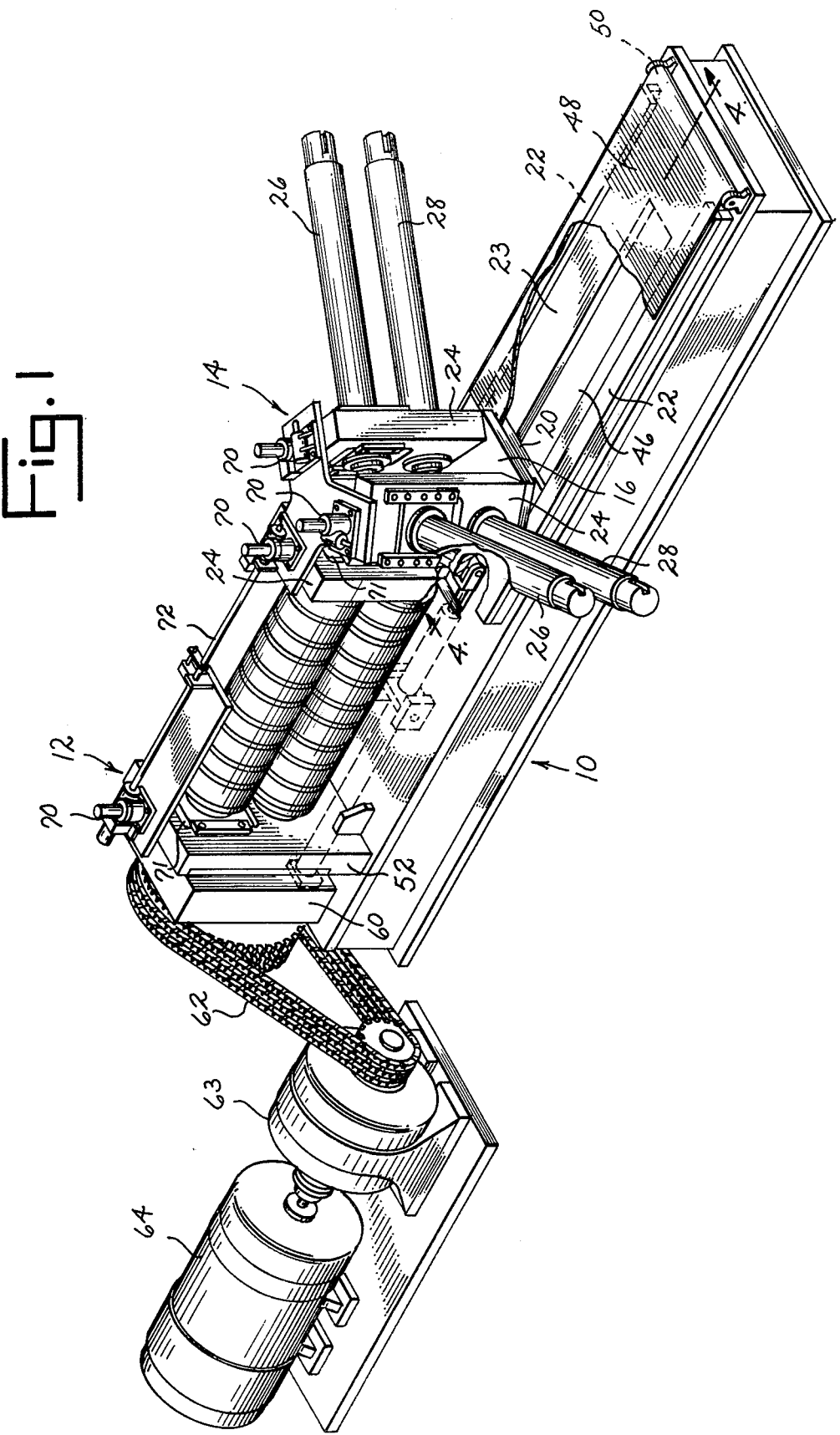
FIG. 1 is a perspective view of the slitter with portions of the slitter broken away for purposes of illustration.

The preferred embodiment illustrated is not intended to be exhaustive nor to limit the invention to precise form disclosed. It is chosen and described in order to best explain the principles of the invention and its application and practical use to thereby enable others skilled in the art to best utilize the invention.

The slitter illustrated in the drawings includes a frame 10. Frame 10 carries an outboard bearing housing 12 and an inboard bearing housing 14. Bearing housing 12 is secured in a fixed location to one end of frame 10. Bearing housing 14 includes a turntable 16 which is mounted by bearing member 18 to a support plate 20. Support plate 20 rests upon ways 21 of bed 23 of frame 10 and is guidably restricted for movement along the bed between a pair of rails 22. Rails 22 extend from approximately midlength of the frame to the opposite end of the frame from bearing housing 12. Turntable 16 is rotatable about a vertical axis upon bearing member 18 relative to support plate 20 and frame 10 and carries a plurality of upright bearing blocks 24. Each bearing block 24 is equal radially positioned about the axis of rotation of turntable 16 and carries a pair of arbors 26 and 28 which extend radially outwardly from such axis of rotation. The number of bearing blocks 24 and therefore the number of pairs of arbors 26, 28 carried by bearing housing 14 can vary depending upon the size and application of the slitter.

With regard to each pair of arbors, arbor 26 parallels, and is positioned over arbor 28. Each arbor 26, 28 is journaled within its supporting bearing block 24. The arbors 26, 28 of each pair of arbors are longitudinally slotted to receive a plurality of knives or cutters 32 and spacers 34 which are inserted over the free ends 36 of the arbors and which cooperate to define cutter assemblies. The cutters 32 of each cutter assembly are maintained upon their respective arbors by removable lock nuts 38.

Bearing housing 14 is shiftable over bed 23 of frame 10 between rails 22 toward and away from bearing housing 12. This movement of bearing housing 14 is accomplished by a hydraulic cylinder 40 and associated piston 42. Cylinder 40 is secured to frame 10 beneath bed 23 of the frame. Piston 42 is connected to a leg 44 which depends from and is connected to support plate 20 of bearing housing 14. Upon the controlled introduction of hydraulic fluid into cylinder 40 by means of customarily available pumping and control apparatus (not shown), bearing housing 14 may be moved toward and away from bearing housing 12 with support plate 20 resting upon and sliding over bed ways 21.

Bed 23 of frame 10 is provided with a slot 46 which extends longitudinally of the frame between rails 22 and which is formed to accommodate leg 44 as it shifts with bearing housing 14 toward and away from bearing housing 12 upon actuation of cylinder 40. A cover 48 has one end connected to bearing housing 14 and its opposite end connected to a spring 49 biased roller 50. Roller 50 is journaled to frame 10 at the exterior ends of rails 22. Cover 48 extends over rails 22 and slot 46 within bed 23 of the frame. As bearing housing 14 is shifted upon actuation of hydraulic cylinder 40 toward or away from bearing housing 12, cover 48 is pulled over slot 46 or taken up by roller 50 so that at all times the slot is partially covered to prevent metal shavings and other material from falling into the frame through the slot as well as to protect workmen around the slitter from getting a leg or arm caught in the slot during movement of bearing housing 14. Cover 48 is preferably formed of a flexible metal material.

Bearing housing 12 includes a bearing block 52 into which sleeves 54 and 56 are journaled for rotation. A gear is secured to each sleeve 54, 56 and in turn is connected by other gearing to a driveshaft 58. Such gearing is enclosed within cover 60 of bearing housing 12. Driveshaft 58 is connected by a chain and sprocket drive 62 to a clutch 63. Clutch 63 is drive connected to an electric motor 64. Actuation of motor 64 causes the rotation of sleeves 54, 56 within bearing block 52 of the housing. The precise construction of bearing housing 12 and the manner in which sleeves 54 and 56 are driven can vary with one such construction being disclosed in U.S. Pat. No. 3,727,503 which is incorporated herein by reference. While outboard bearing housing 12 of this invention is fixed in position relative to frame 10 and the outboard bearing housing disclosed in U.S. Pat. No. 3,727,503 is shiftable relative to the frame, the manner of driving the rotatable sleeves journaled within the bearing housings and construction of the sleeves can be the same.

Figure 2:
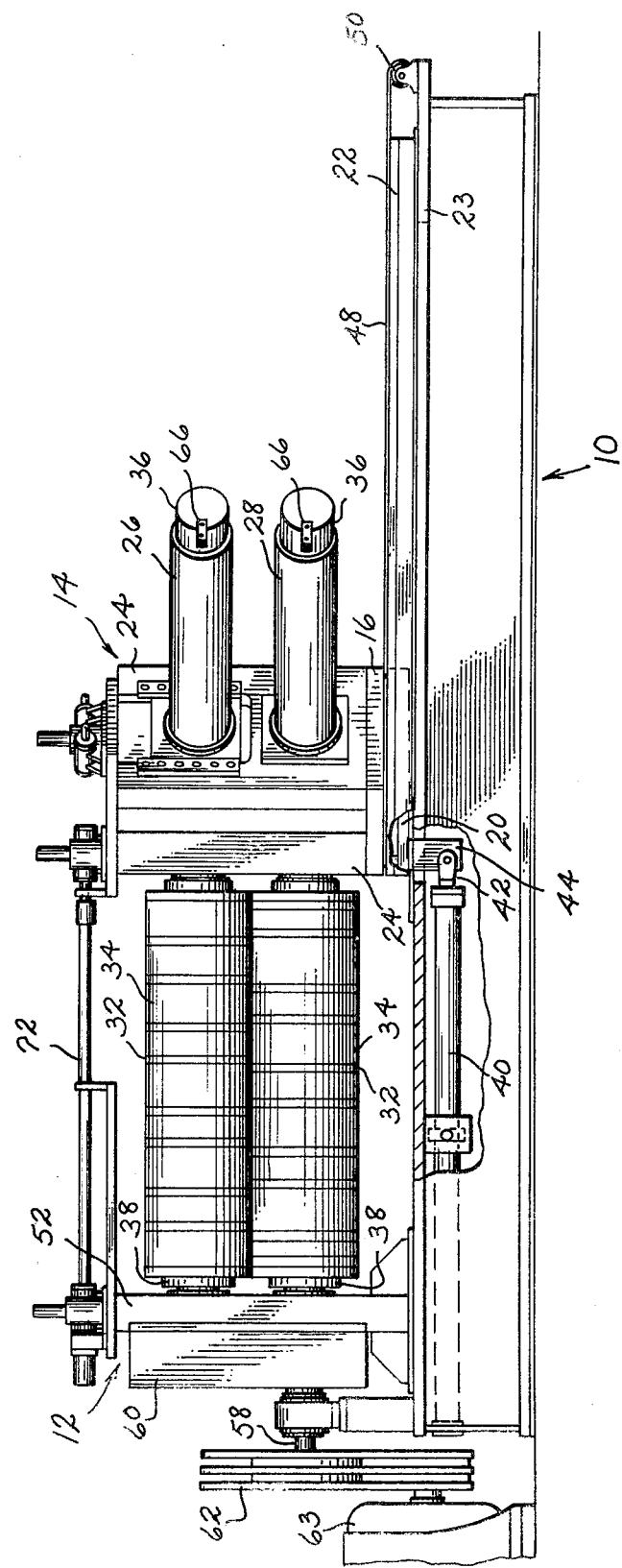
FIG. 2 is an elevational view of the slitter shown in one operative position.
Figure 3:
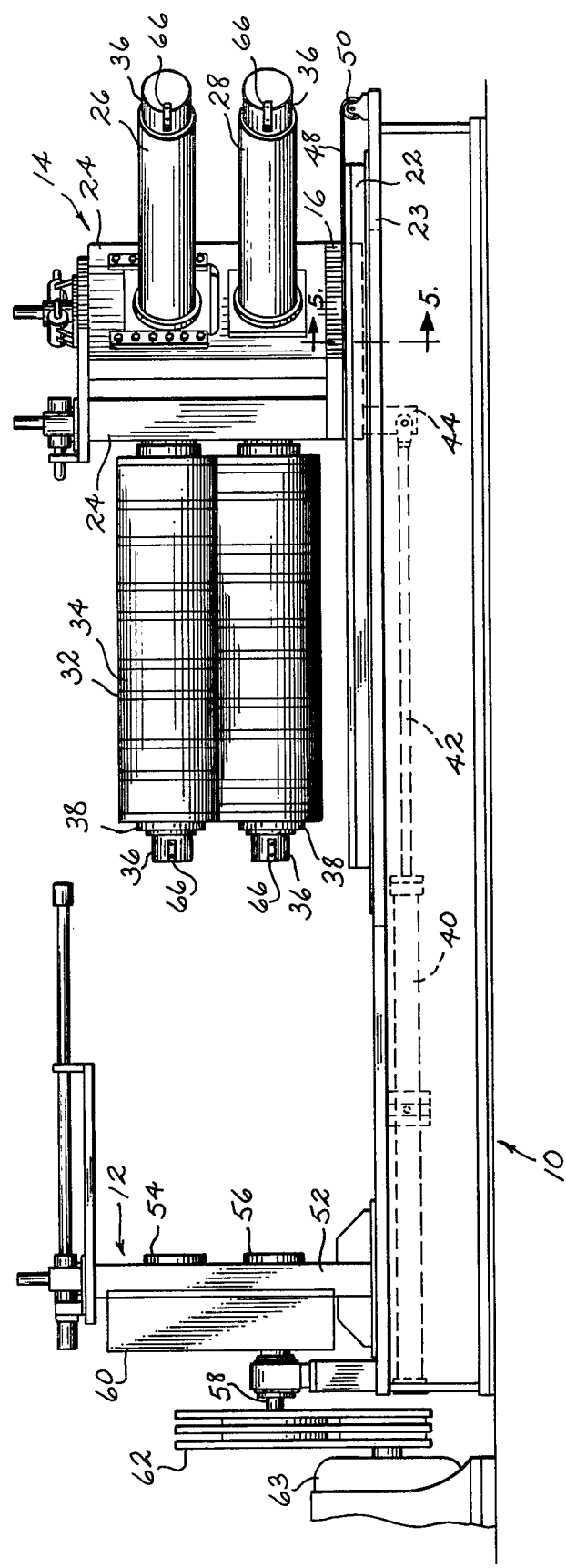
FIG. 3 is an elevational view of the slitter as shown in an non-operative position.

End 36 of each arbor 26, 28 carried by bearing housing 14 has a slot 66 formed in it to interlock with an interval key carried by each sleeve 54, 56 of bearing housing 12. With bearing housing 14 positioned in its non-operative or set up position shown in FIG. 3, a selected pair of arbors can be fitted with cutters 32 and spacers 34. Once this selected pair of arbors has been set up, hydraulic cylinder 40 is actuated causing bearing housing 14 to be shifted from its non-operative position to its operative position as shown in FIG. 2 with ends 36 of the arbors entering sleeves 54, 56 of bearing housing 12 and with the keys of the sleeves interfitting with slots 66 formed in the arbor ends. The desired operational overlap between cutters 32 of the bearing housing supported arbors 26, 28 can then be set by operation of the interconnected jackscrew assemblies 70 mounted atop each of the bearing blocks 24 of bearing housing 14 and bearing block 52 of bearing housing 12. Each arbor 26 and sleeve 54 is mounted along with their respective support bearings for vertical movement within slotted openings 71 in bearing blocks 24 and 52 so as to be separable from underlying arbors 28 and sleeve 56 upon actuation of jackscrew assemblies 70.

The construction and manner of operation of jackscrew assemblies 70 and interconnected cross-over shaft 72 for varying the spacing between arbors 26 and 28 is disclosed generally in U.S. Pat. No. 3,727,503.

The sheet material utilized in the slitting operation is carried upon a stock roll and is fed between the cutter assembly of cutters 32 and spacers 34 carried upon the pair of arbors 26, 28 interlocked with sleeves 54, 56 of bearing housing 12. Pinch rolls (not shown) which normally form a part of the slitter line and which are located between the stock roll of the sheet material and the slitter arbors assist in guiding the sheet material through the cutter assembly. The slit sheet material then emerges from the cutter assembly and is wound upon a recoiler which serves to pull the material through the cutter assembly. The power drive to the interlocked arbors serves to assist in feeding the sheet material through the cutter assembly as well as to assist in the cutting operation. Clutch 63 can also serve as an override to permit free running of the arbors should the speed of the recoiler exceed that of the driven speed of the arbors.

While one slitting operation is being completed the user of the slitter can set up another cutter assembly consisting of other cutters 32 and spacers 34 at one of the other pairs of arbors 26, 28 in preparation for the next slitting operation. When the current slitting operation has been completed, hydraulic cylinder 40 is actuated to urge bearing housing 14 away from bearing housing 12 and into its non-operative or set up position shown in FIG. 3. By use of shiftable bearing housing 14, it is no longer necessary to design the pinch rolls so that they can be moved or pivoted out of the way of the rotating arbors. The slitter user then rotates bearing housing 14 with turntable 16 rotating over support plate 20 until the preassembled cutter assembly is pivoted into operative position for the next slitting operation. Hydraulic cylinder 40 is then again actuated causing bearing housing 14 to be slid into its operative position with ends 36 of the arbors carrying the preassembled cutter assembly interlocking with sleeves 54, 56 of bearing housing 12.

It is understood that the above described invention is not to be limited to the details given but that it may be modified within the scope of the following claims.

What we claim is:

1. In a slitter including a frame, first and second spaced bearing housings carried by said frame, multiple spaced pairs of arbors carried by said first bearing housing, each pair of arbors journaled at one end within said first bearing housing, each arbor adapted to carry removable cutters, the improvement comprising support means mounting said first bearing housing for rotational movement about a vertical axis relative to said frame, means for shifting said support means toward and away from said second bearing housing, each pair of arbors being alignable with said second bearing housing upon pivotal movement of said first bearing housing, a selected pair of arbors being supported by said first and second bearing housings when the first bearing housing is shifted toward the second bearing housing and the outer ends of said selected pair of arbors are journaled within the second bearing housing.

2. The slitter of claim 1 wherein said support means is supported upon said frame for guided movement toward and away from said second bearing housing.

3. The slitter of claim 2 wherein said means for shifting said support means includes a power actuator connected between said frame and support means.

4. The slitter of claim 3 wherein said power actuator is a hydraulic cylinder and piston.

5. The slitter of claim 2 and drive means for rotating at least one of the arbors of each pair of arbors when journaled in said second bearing housing.

6. The slitter of claim 5 wherein said drive means includes parts carried by said second bearing housing making driving contact with said one arbor when journaled in said second bearing housing.

7. The slitter of claim 2 wherein said frame includes a bed having guide means extending thereover, said guide means for directing the movement of said first bearing housing support means over said bed toward and away from said second bearing housing between the proximate and distal ends of said guide means.

8. The slitter of claim 7 and cover means associated with said first bearing housing and frame for covering the bed of said frame between said guide means distal end and first bearing housing irrespective of the location of said first bearing housing along said bed.

9. The slitter of claim 8 and take up means located adjacent the distal end of said guide means, said cover means having its one end connected to said first bearing housing, said cover means having its other end connected to said take up means, said take up means for letting out and taking up said cover means as said first bearing housing moves towards and away from said second bearing housing.

10. In a slitter including first and second spaced bearing housings, multiple spaced pairs of arbors carried by said first bearing housing, each pair of arbors journaled at one end within said first bearing housing, each arbor adapted to carry removable cutters, the improvement comprising support means mounting said first bearing housing for rotational movement about a vertical axis, means for shifting said support means in a generally horizontal plane toward said second bearing housing into the first position and away from said second bearing housing into a second position, each pair of arbors being alignable with said second bearing housing upon pivotal movement of said first bearing housing, a selected pair of arbors being supported by said first and second bearing housings when the first bearing housing is shifted into its first position and the selected pair of arbors are journaled within the second bearing housing to extend into the path of advancement of sheet material through said slitter.

* * * * *